United States Patent [19]

Balzer

[11] Patent Number: 4,542,790

[45] Date of Patent: * Sep. 24, 1985

[54] PROCESS FOR EXTRACTING EXTENSIVELY EMULSION-FREE OIL FROM A SUBTERRANEAN RESERVOIR

[75] Inventor: Dieter Balzer, Marl, Fed. Rep. of Germany

[73] Assignee: Chemische Werke Huels A.G., Marl, Fed. Rep. of Germany

[*] Notice: The portion of the term of this patent subsequent to Oct. 23, 2001 has been disclaimed.

[21] Appl. No.: 633,680

[22] Filed: Jul. 25, 1984

Related U.S. Application Data

[63] Continuation-in-part of Ser. No. 300,547, Sep. 9, 1981, abandoned.

[30] Foreign Application Priority Data

Sep. 10, 1980 [DE] Fed. Rep. of Germany ....... 3033927

[51] Int. Cl.$^4$ ............................................. E21B 43/22
[52] U.S. Cl. .................... 166/274; 166/273; 252/8.55 D
[58] Field of Search .................. 252/8.55 D; 166/273, 166/274, 275

[56] References Cited

U.S. PATENT DOCUMENTS

| | | | |
|---|---|---|---|
| 2,233,381 | 2/1941 | De Groote et al. ............... | 252/8.55 |
| 3,811,505 | 5/1974 | Flournoy et al. .................. | 166/274 |
| 4,110,228 | 8/1978 | Tyler et al. ....................... | 252/8.55 |
| 4,265,308 | 5/1981 | Hodges et al. .................. | 166/273 X |
| 4,293,428 | 10/1981 | Gale et al. ...................... | 166/274 X |

OTHER PUBLICATIONS

Lepper, "Erdoel Ergas Zeitschrift", 92:426, (1976).
Balzer et al., Tenside Detergents 16:256, (1979).

*Primary Examiner*—Herbert B. Guynn
*Attorney, Agent, or Firm*—Millen & White

[57] ABSTRACT

A process for extracting extensively emulsion-free oil from a subterranean deposit, the formation water of which has a medium or high total salinity and has a relatively low alkaline earth metal ion concentration, comprising injecting into an injection well therein a 1–20% strength aqueous tenside solution or dispersion in formation water of a mixture of 10–90% of carboxymethylated ethoxylates of the formula

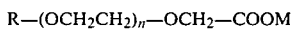
$$R-(OCH_2CH_2)_n-OCH_2-COOM$$

and 90–10% of ethoxylates of the formula

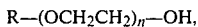
$$R-(OCH_2CH_2)_n-OH,$$

wherein
R is a linear or branched hydrocarbon aliphatic group of 4–20 carbon atoms or an alkylphenyl group of 1–14 carbon atoms in the alkyl group,
n is 3–15, and
M is an alkali or alkaline earth metal ion or ammonium, wherein alkaline earth metal ions are contained in the tenside solution or dispersion in such a concentration that the phase inversion temperature of the system:crude oil/formation water/tenside solution or dispersion, lies at most 10° C. above the deposit temperature.

10 Claims, 1 Drawing Figure

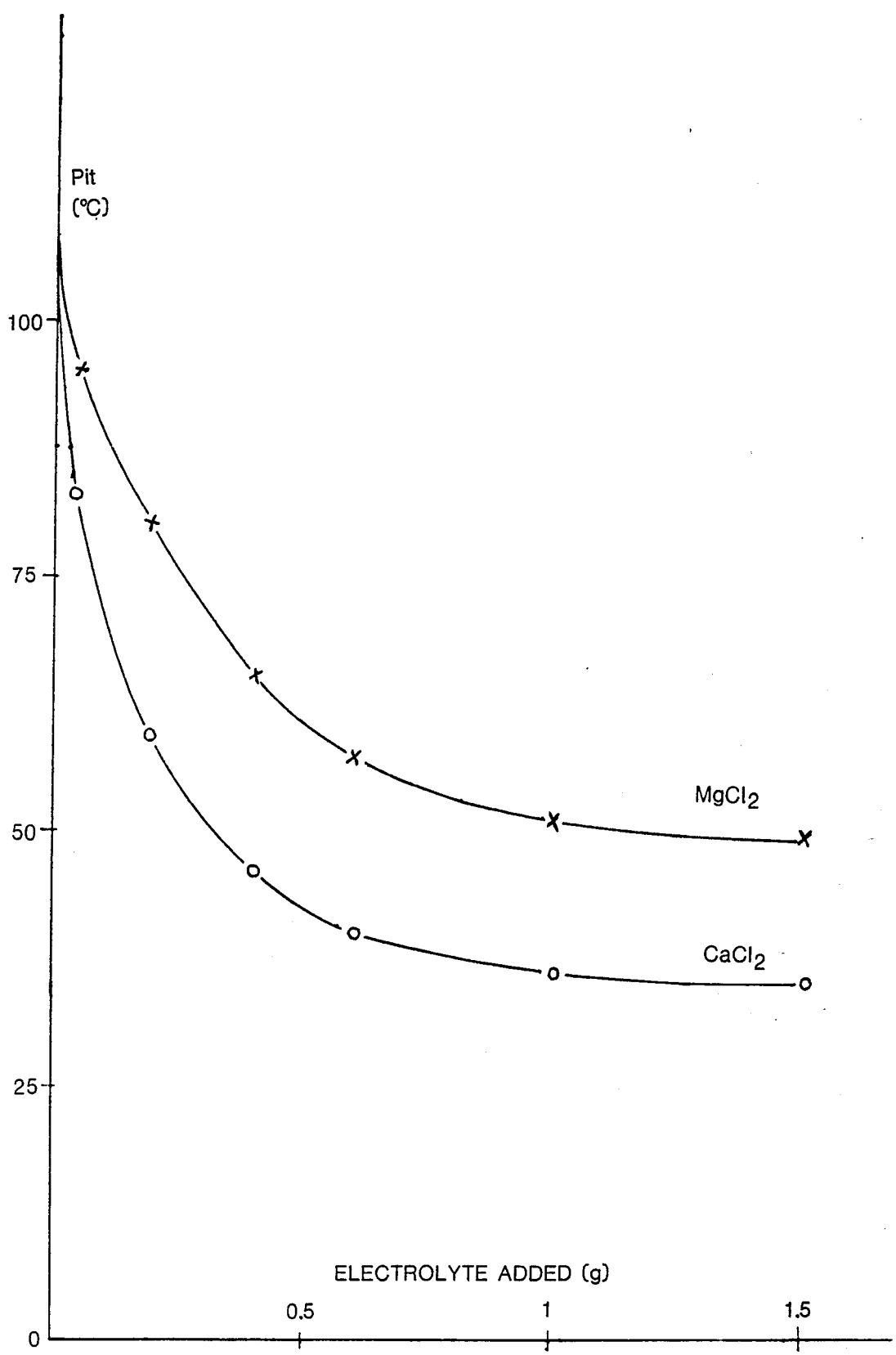

PROCESS FOR EXTRACTING EXTENSIVELY EMULSION-FREE OIL FROM A SUBTERRANEAN RESERVOIR

This application is a continuation-in-part of application Ser. No. 300,547, filed Sept. 9, 1981, now abandoned.

This application is related to commonly assigned application Ser. No. 300,427, filed on even date, now U.S. Pat. No. 4,478,281, and whose entire disclosure is incorporated by reference herein.

BACKGROUND OF THE INVENTION

The present invention relates to a process for oil recovery by tenside flooding.

In the extraction of oil from petroleum deposits, only a fraction of the originally existing oil can usually be recovered by primary extraction methods. In these methods, the oil is brought to the surface using the natural reservoir pressure. In secondary oil recovery, water is forced into one or several injection wells of the formation and the oil is forced to one or several production wells and thereafter brought to the surface. This so-called water flooding is a relatively inexpensive secondary measure and, accordingly, is utilized frequently. However, in many cases it results in only a minor additional oil extraction from the deposit.

An effective displacement of the oil, which, though more expensive, is urgently required from the viewpoint of the national and international economy in view of the present petroleum scarcity, is accomplished by tertiary measures. These include processes wherein either the viscosity of the oil is reduced and/or the viscosity of the flooding water is increased and/or the surface tension between water and oil is decreased.

Most of these processes can be classified as solution flooding, mixture flooding, thermal oil recovery methods, tenside or polymer flooding and/or as a combination of several of the aforementioned processes.

Thermal recovery methods involve the injection of steam or hot water, or take place as an in situ combustion. Solution or mixture processes involve the injection of a gaseous and/or liquid solvent for the petroleum into the deposit.

Tenside flooding processes, depending on tenside concentration and optionally, the type of tenside and additives, can be differentiated among tenside-supported water flooding, the usual tenside flooding (low-tension flooding), micellar flooding, and emulsion flooding. All are primarily based on a strong reduction of the surface tension between oil and deposit water. However, in some instances, especially in the presence of relatively high tenside concentrations, water-in-oil dispersions are produced. These exhibit a markedly increased viscosity as compared with the oil, so that, tenside flooding also attempts to achieve a reduction of the mobility ratio whereby, as is known, the degree of efficiency of oil displacement is raised. Genuine polymer flooding is predominantly based on attaining the last-mentioned effect of a more favorable mobility ratio between oil and flooding water.

Heretofore, organic sulfonates, such as alkyl, alkylaryl, or petroleum sulfonates, have been described above all others as the oil-mobilizing tensides. However, these compounds have a very low tolerance limit with respect to the salinity of the waters present in the deposits. Salt concentrations of as low as 1,000 ppm are considered problematic. The sensitivity of these tensides against alkaline earth metal ions is especially pronounced. In this connection, about 500 ppm is assumed to be the upper critical limit concentration (U.S. Pat. No. 4,110,228). In this case, precipitation products occur in the presence of higher salt concentrations. These can lead to plugging of the formation. However, since many deposit waters possess substantially higher salinities, e.g., in Northern Germany up to 250,000 ppm, attempts have been made to find ways to exploit the otherwise good oil-mobilizing properties of the organic sulfonates for deposit systems of higher salinity. Organic sulfonates do show a lesser electrolyte sensitivity in mixture with cosurfactants such as alcohols or nonionic tensides, but in such cases the oil-mobilizing effect is highly impaired as well.

In contrast to this group of compounds, alkyl or alkylaryl polyglycol ether sulfates or carboxymethylated alkyl or alkylaryl ethoxylates show good compatibility even with extremely high salinities (e.g. 250,000 ppm) of the deposit waters. Since the oil-mobilizing effect of these tensides is high [H. J. Neumann, "DGMK BE-RICHTE" [Reports of the German Society for Petroleum Technology and Carbon Chemistry], Report 164 (1978); D. Balzer and K. Kosswig, Tenside Detergents 16:256 (1979)] and their manufacture is simple and economical, this class of compounds is very highly suitable for use in oil displacement in medium and high-salinity deposit systems (30,000–250,000 ppm total salt content).

In numerous investigations on model formations using carboxymethylated ethoxylates as the tensides, however, it has been observed that the tertiary oil was transported primarily as an emulsion. Since O/W emulsions are involved, the separation of which into an oil phase and a water phase represents an expensive step in petroleum technology, this imposes a considerable disadvantage on the process.

SUMMARY OF THE INVENTION

Therefore, it is an object of the present invention to provide a process permitting the transport of tertiary oil mobilized by carboyxmethylated ethoxylates so that the oil is extensively free of emulsion.

Upon further study of the specification and appended claims, further objects and advantages of this invention will become apparent to those skilled in the art.

These objects have been achieved by providing a process for extracting extensively emulsion-free oil from a subterranean deposit, the formation water of which is of medium or high total salinity and is relatively poor in alkaline earth metal ions, by forcing into an injection well a 1–20% strength aqueous solution or dispersion in formation water of carboxymethylated ethoxylates of the formula

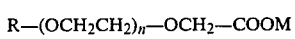

$$R-(OCH_2CH_2)_n-OCH_2-COOM$$

wherein
- R is a linear or branched aliphatic residue of 4–20 carbon atoms or an alkylaromatic residue of 1–14 carbon atoms in the alkyl group,
- n is 1–30, and
- M is an alkali or alkaline earth metal ion or ammonium,
- wherein alkaline earth ions are added to the tenside solution in such a concentration that the phase inversion temperature of the system, crude oil/formation water/tenside solution lies at most 10° C. above the deposit temperature.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 shows the dependence of phase inversion temperatures (PIT) on the concentration of added electrolyte.

DETAILED DISCUSSION

The process of this invention is based on the surprising finding that it is possible to flood out the mentioned oil in predominantly emulsion-free condition if, additionally, soluble alkaline earth metal salts are added to the solution or dispersion of the tenside in deposit water. These generally involve formations, the waters of formation of which possess an alkaline earth metal ion content of less than 3 wt %. Apparently, this property is compound-specific for carboxymethylated ethoxylates, for it has not been observed with polyglycol ether sulfates, even in admixture with ethoxylates.

The present invention relates to an improved use of carboxymethylated ethoxylates as oil-mobilizing tensides. Suitably, these compounds are produced according to German Patent No. 2,418,444, whose disclosure is incorporated by reference herein, by reacting ethoxylates of the formula R—(O—CH$_2$—CH$_2$)$_n$OH with a salt of chloracetic acid in the presence of alkali metal hydroxide or alkaline earth metal hydroxide. However, other production methods are likewise suitable.

R is a saturated or unsaturated, straight-chain or branched, hydrocarbon aliphatic, e.g., alkyl, residue of 4–20, preferably 8–16 carbon atoms, or an alkylaryl (e.g., alkylphenyl) or dialkylaryl residue of 1–14 carbon atoms in the alkyl residue. The symbol n can have values of 1 to 30, preferably 3 to 15. The cation M can be sodium, potassium, lithium, ammonium, calcium, or magnesium, etc.

In correspondence with their manufacture, the carboxymethylated ethoxylates always contain considerable amounts of unreacted ethoxylate. The foregoing formula R—(O—CH$_2$—CH$_2$)$_n$—OCH$_2$—COOM therefore denotes in all cases a mixture with varying amounts of unreacted ethoxylate. Accordingly, a degree of carboxymethylation can be defined. It has been found that mixtures with a carboxymethylation degree of 10 to 90% by weight, preferably 30 to 90% by weight, are effectively capable of displacing the oil. Especially effective are mixtures with degrees of carboxymethylation of 50–85% by weight.

The aforedescribed mixtures of anionic and nonionic tensides, called carboxymethylated ethoxylates, are soluble or at least readily dispersable in ordinary deposit waters, and no precipitations whatsoever are observed.

The procedure according to this invention can be conducted as follows. After determining the oil-mobilizing properties of a carboxymethylated ethoxylate for the respective deposit system by a preliminary experiment, e.g., using a sand pack as the model formation, the tenside is dissolved or dispersed in formation water. To the latter is added, beforehand or subsequently, a water-soluble alkaline earth metal salt in a suitable concentration. Suitable tenside concentrations generally are 0.2 to 20%, preferably 1 to 10% by weight.

The effective concentration of the alkaline earth metal salts in the formation water serving as the solvent for the tenside is routinely determined using the phase inversion temperature (PIT) of the crude oil emulsion. The latter is produced from the oil, from the formation water enriched with alkaline earth metal salts, from the respective deposit, and from the selected tenside. When determining the PIT, the phase ratio of oil to water in the emulsion can be 2:1 to 1:9; suitably, 1:1 is selected. Suitable tenside quantities in general are concentrations of 0.5 to 10% by weight; a tenside concentration of 1–2% by weight is advantageous. The PIT, at which an O/W emulsion will change over into a W/O emulsion can be very readily identified by measuring the electric conductivity, as explained in detail in the prior art. [See e.g., D. Balzer and K. Kosswig, Tenside Detergents 16:256 (1979) which is incorporated by reference herein]. Since a minimum of the surface tension between the oil phase and the water phase occurs at the PIT or at least in the proximity thereof, this temperature indicates the range of favorable oil mobilization by the tenside. In addition, it is known that the oil can be flooded out from model formations predominantly free of emulsion if the PIT lies either below the deposit temperature or conforms therewith (D. Balzer and K. Kosswig, see above). According to more recent findings, this is also the case if the PIT lies up to 10° C. above the deposit temperature. As fully discussed in related U.S. application Ser. No. 300,427, which has been incorporated by reference herein, under certain conditions, the injection methods discussed herein can lead to certain undesirable increases in deposit pressure during the flooding operation. The present invention is especially advantageous when conducted such that the phase inversion temperature of the described system lies in the range of 0°–10° C. above the deposit temperature preferably 1°–5° C. above it. The details of this advantageous aspect are fully described in the mentioned related application.

In situations involving deposit waters poor in alkaline earth metal content (less than 3% alkaline earth metal ions in the formation water), it has now been found, surprisingly, that, in the presence of carboxymethylated ethoxylates, the PIT greatly decreases by the addition of alkaline earth metal salts. On the basis of this observation, it is possible to optimally mobilize oil and transport it, emulsion-free, by adding alkaline earth metal ions in conjunction with a specific carboxymethylated ethoxylate for which the PIT of the mixture:oil/formation water/tenside, lies higher than the deposit temperature. The concentration of alkaline earth metal ions determined to be suitable according to the above-described method of this invention is, thus, added to the tenside solution. Without intending to limit the invention in any way, usually it falls in the range of 0.1–1.5 wt %. The latter is introduced into the deposit, using injection pumps, through one or more injection wells. In this connection, the tenside solution combined with the alkaline earth metal salts can be used either continuously or in the form of a slug, i.e. a narrowly limited volume of 0.05–4.0 PV (=the multiple of the pore volume of the deposit). The size of the slug is dependent above all on the concentration of the tenside solution and on the economics.

Suitably, water flooding can precede the tenside flooding step. The produced formation water is utilized as the flooding fluid. Alkaline earth metal ions can also be added to this water at the same concentrations at which they are added to the tenside solution. This coaddition of alkaline earth metal ions in this formation water is optional and is advantageous because it protects the concentration of the alkaline earth metal ions in the tenside slug from dilution. When added, the alkaline earth metal concentration here can also be somewhat increased (by 5–10%) as compared to that of the tenside slug. The size of this water slug is 0.01–4 PV, preferably 0.05–1.0 PV. Following the tenside slug, a polymer slug is advantageously injected into the deposit for reasons of mobility control as well as for protecting the tenside solution from penetrating formation water. For this purpose, a polymer or polymer mixture is dissolved in the formation water in such a concentration that the viscosity is 4 to 6 times as high as that of the oil. For deposits of medium or relatively high salinity (3–28 wt %), especially suitable in this connection are biopolymers, such as polysaccharides or cellulose derivatives which still possess sufficient viscosity in the presence of the increased salt concentrations and do not result in precipitations. Once again, the same or a somewhat higher (5–10%) alkaline earth metal ion concentration as used in the case of the tenside solution, can be added to the polymer solution and/or, optionally, as mentioned, previously to the formation water which serves as a solvent. Again, the coaddition of alkaline earth metal ions to the subsequently added formation water, e.g., containing the viscosity raising polymer, is optional and when utilized is advantageous because it protects the ion concentration in the tenside slug.

Suitable alkaline earth metal salts to be used in accordance with this invention include all alkaline earth metal compounds which, alone or in interaction with the other compounds of the process, do not cause precipitations or other incompatibilities, such as, for example, extreme changes in viscosity. Examples include Ca chloride, Mg chloride, Ca bromide, Mg bromide, Ca nitrate, Mg nitrate, Sr chloride and the like. For reasons of economy and environmental protection, Ca chloride and Mg chloride are especially preferred. Also suitable as additives in the tenside solution are the alkaline earth metal salts of the carboxymethylated ethoxylates.

Suitably, normal water flooding follows the injection of the polymer solution. This flooding is continued as long as oil can be economically extracted.

Without further elaboration, it is believed that one skilled in the art can, using the preceding description, utilize the present invention to its fullest extent. The following preferred specific embodiments are, therefore, to be construed as merely illustrative, and not limitatative of the remainder of the disclosure in any way whatsoever. In the following examples, all temperatures are set forth uncorrected in degrees Celsius; unless otherwise indicated, all parts and percentages are by weight.

EXAMPLES

Example 1 (Measurement of PIT)

50 ml of a paraffinic crude oil ($\rho_{20° C}$: 0.863 g/cc; $\eta_{20° C}$ 10 mPa·S) and 50 ml of 20% NaCl solution wherein 1 g of carboxymethylated nonylphenol ethoxylate with 5.3 moles of ethylene oxide/mole were dispersed, are charged into a 150 ml double-wall vessel of glass for measuring the electrical conductivity of liquids. The mixture was then briefly exposed to a high-speed agitator unit. The resultant crude oil emulsion was prevented from breaking up by continuing the agitation with a usual magnetic stirrer. To measure the electric conductivity, the conductivity meter LF 42 WTW with temperature compensation was utilized. The conductivity was measured in dependence on the temperature. At 20° C., this conductivity was, for the emulsion, about $4 \cdot 10^4$ μmho. During gradual heating to 100° C., with the use of a thermostat combined with a temperature program generator, the conductivity rose to about $6 \cdot 10^4$ μmho. In contrast, if 40 mg of $CaCl_2$ is added to the aqueous NaCl solution, a phase inversion is observed at 83±1° C., where the electric conductivity changes jump-like from about $5 \cdot 10^4$ μmho to values of <1 μmho. If the emulsion is cooled off again, then the conductivity takes the reverse course in a jump-like mode at 83° C. This temperature is called the phase inversion temperature. If the calcium ion concentration is increased, the PIT is lowered. Very similar effects are also observed when adding magnesium salts (see the figure) and strontium salts.

Example 2 (Comparative Example)

To produce an artificial formation, a thermostable high-pressure pipe having a length of 70 cm and a diameter of 5 cm, equipped with a temperature measuring device and a manometer, bilaterally sealable by threaded closures with capillary inlet and pressure-maintaining valve outlet, is charged with edge-rounded quartz sand. The sand bulk is saturated with formation water by means of a high-pressure pump, and the desired temperature is set by a thermostat. Permeability is measured; and thereafter, saturation with the paraffinic crude oil is effected, while simultaneously determining the retained water content.

At this point in time, water flooding is carried out with a flooding rate of about 4 m/d. After flooding in about 1.5 PV of formation water, reaching a watering degree of 98–100%, a 2% solution of carboxymethylated nonylphenol ethoxylate with 5.4 moles of ethylene oxide per mole (70% carboxylate, 22% ethoxylate, 8% NaCl) is injected until the watering degree after transport of the oil bank is, for a relatively long period of time, about 100%. The flooding rate is, in this procedure, about 1.5 m/d. The testing temperature is 55° C., the pressure is about 60 bar. The solvent for the tenside in this and all following examples was a synthetic formation water, consisting of 10% NaCl, 0.5% KCl, 0.1% $MgCl_2$, 0.2% $CaCl_2$, and 0.05% $SrCl_2$. The PIT of the corresponding emulsion made up of oil, formation water, and tenside solution at a phase ratio of 1:1 was 85° C. and thus ranged markedly above the formation temperature. The porosity of the sand charge was 53%, the permeability 5.2 D, the residual water content was about 20%. By water flooding, an oil extraction of 72% was attained; with the aid of the tenside solution, the total oil extraction could then be raised to 93%, although the tertiary oil was obtained exclusively as an O/W emulsion.

Example 3 (According to the Invention)

This experiment was repeated under essentially identical conditions used in Example 2, but with a formation water additionally containing 1.3% $CaCl_2$. The PIT in this case was only 46° C. and thus ranged somewhat below the temperature of the artificial formation. Its porosity was 53%, its permeability was 6.5 D, the retained water content was about 20%. By water flooding of the formation, 80% of the crude oil was liberated, and another 17% by tenside flooding, i.e., free of emulsion. Only after 97% of the oil had been transported did the tenside break through.

Example 4 (According to the Invention)

This flooding trial was conducted under very similar conditions to those of Example 2, but with a formation water containing additionally 0.8% CaCl$_2$ and using a more firmly packed sand batch. The PIT was 49° C., the porosity was 47%, the permeability was 1.8 D, and the retained water content was about 23%. By water flooding, 76% of the crude oil and, by the subsequent tenside flooding, another 22% were transported emulsion-free, before breakthrough of the tenside took place.

Example 5 (Comparative Example)

Example 2 (Comparative Example) was repeated under practically identical conditions but with a more firmly packed artificial formation. The porosity was 47%, the permeability was 1.8 D, the retained water content was about 22%. By flooding with formation water, 75% of the oil was liberated, and by subsequent tenside flooding, another 19% was obtained, but exclusively as an O/W emulsion.

Example 6 (According to the Invention)

This experiment was conducted under very similar conditions to those of Example 5, but with the addition of 4.9% MgCl$_2$ to the formation water. The PIT was 48° C. and thus was below the formation temperature. The porosity was 47%, the permeability was 1.1 D, the retained water content was 26%. By water flooding, 74% of the oil was liberated, and another 24% by tenside flooding before breakthrough took place and additional oil was conducted as an emulsion.

Example 7 (in accordance with the invention)

This flooding test was performed under essentially the same conditions as in Example 3, but with a carboxymethylated nonyphenoloxethylate having 5.9 moles of ethylene oxide per mole (81% carboxylate, 10% oxethylate, 9% NaCl). The PIT was 59° C. and was therefore 4° C. above the deposit temperature (55° C.). The porosity of the formation was 45%, the permeability 2.1 D, and the retained water content 25%. By water flooding, 76% of the crude oil was extracted, and a further 22% of the crude oil was extracted by means of the subsequent tenside flooding step, before further oil (traces) was released as an emulsion.

Example 8 (in accordance with the invention)

This test was performed under essentially the same conditions as in Example 3, but with a carboxymethylated C$_{12/14}$ alcohol oxethylate having 4.9 moles of ethylene oxide per mole and at a test temperature of 60° C. The PIT of the crude oil emulsion used was 65° C. and was therefore 5° C. above the deposit temperature. The porosity of the foration was 47%, the permeability 1.7 D, and the retained water content 24%. 69% of the crude oil was extracted by means of flooding with formation water and a further 30% of the crude oil was extracted by means of the subsequent tenside flooding step. The tenside then broke down, and further oil was released in the form of an oil/water emulsion.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for extracting extensively emulsion-free oil from a subterranean deposit, the formation water of which has a medium or high total salinity and has a relatively low alkaline earth metal ion concentration, comprising injecting into an injection well therein an aqueous tenside solution or dispersion in formation water comprising 1–20% by weight of a mixture of 10–90% of carboxymethylated ethoxylates of the formula

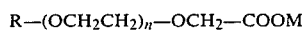

R—(OCH$_2$CH$_2$)$_n$—OCH$_2$—COOM and 90–10% of ethoxylates of the formula

R—(OCH$_2$CH$_2$)$_n$—OH, wherein
R is a linear or branched hydrocarbon aliphatic group of 4–20 carbon atoms or an alkylphenyl or dialkylphenyl group of 1–14 carbon atoms in the alkyl groups,
n is 1–30, and
M is an alkali or alkaline earth metal ion or ammonium,
wherein alkaline earth metal ions are contained in the injected tenside-solution or dispersion in such a concentration that the phase inversion temperature of the system: crude oil/formation water/tenside solution or dispersion, lies 0°–10° C. above the deposit temperature.

2. A process of claim 1, wherein 0.05–0.4 PV of formation water containing alkaline earth metal ions in a concentration which is the same as or 5–10% higher than that in the tenside solution, is injected as a preliminary flushing liquid prior to injection of the tenside solution.

3. A process of claim 1, wherein formation water containing alkaline earth metal ions in a concentration which is the same as or 5–10% higher than that in the tenside solution, is injected as a subsequent flushing liquid after the injection of the tenside solution.

4. A process of claim 3, wherein the subsequently added aqueous solution contains a viscosity-raising polymer.

5. A process of claim 1, wherein the range of carboxymethylated ethoxylates in the tenside mixture is 30–90% by weight.

6. A process of claim 1, wherein the amount of alkaline earth metal ions added is sufficient to achieve a phase inversion temperature which lies 1°–5° C. above the deposit temperature.

7. A process of claim 1, wherein the alkaline earth metal ion is added in the form of CaCl$_2$, CaBr$_2$, MgBr$_2$, Ca(NO$_3$)$_2$, Mg(NO$_3$)$_2$, SrCl$_2$ or an alkaline earth salt of a carboxymethyl ethoxylate.

8. A process of claim 1 wherein n is 3–15.

9. A process of claim 1 wherein n is 1—3.

10. A process of claim 1, wherein the phase inversion temperature lies 1°–10° C. above the deposit temperature.

* * * * *